(No Model.) 7 Sheets—Sheet 2.
C. BROWNING & R. H. LOGAN.
CIGAR BUNCHING MACHINE.
No. 392,100. Patented Oct. 30, 1888.
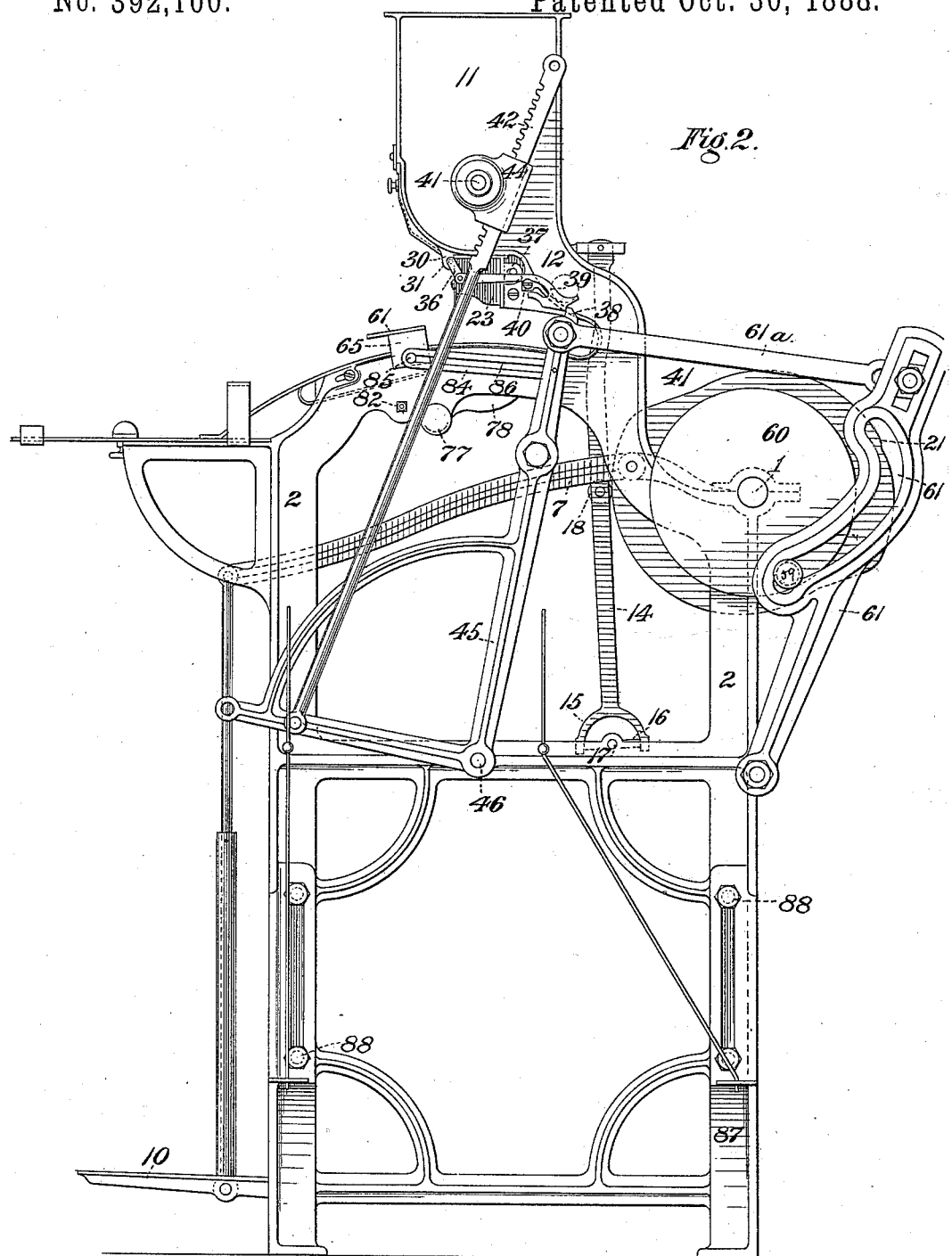
WITNESSES:
C. M. Clarke,
F. E. Gaither.
INVENTORS.
Clinton Browning.
Ralph H. Logan.
by Darwin S. Wolcott
Att'y.

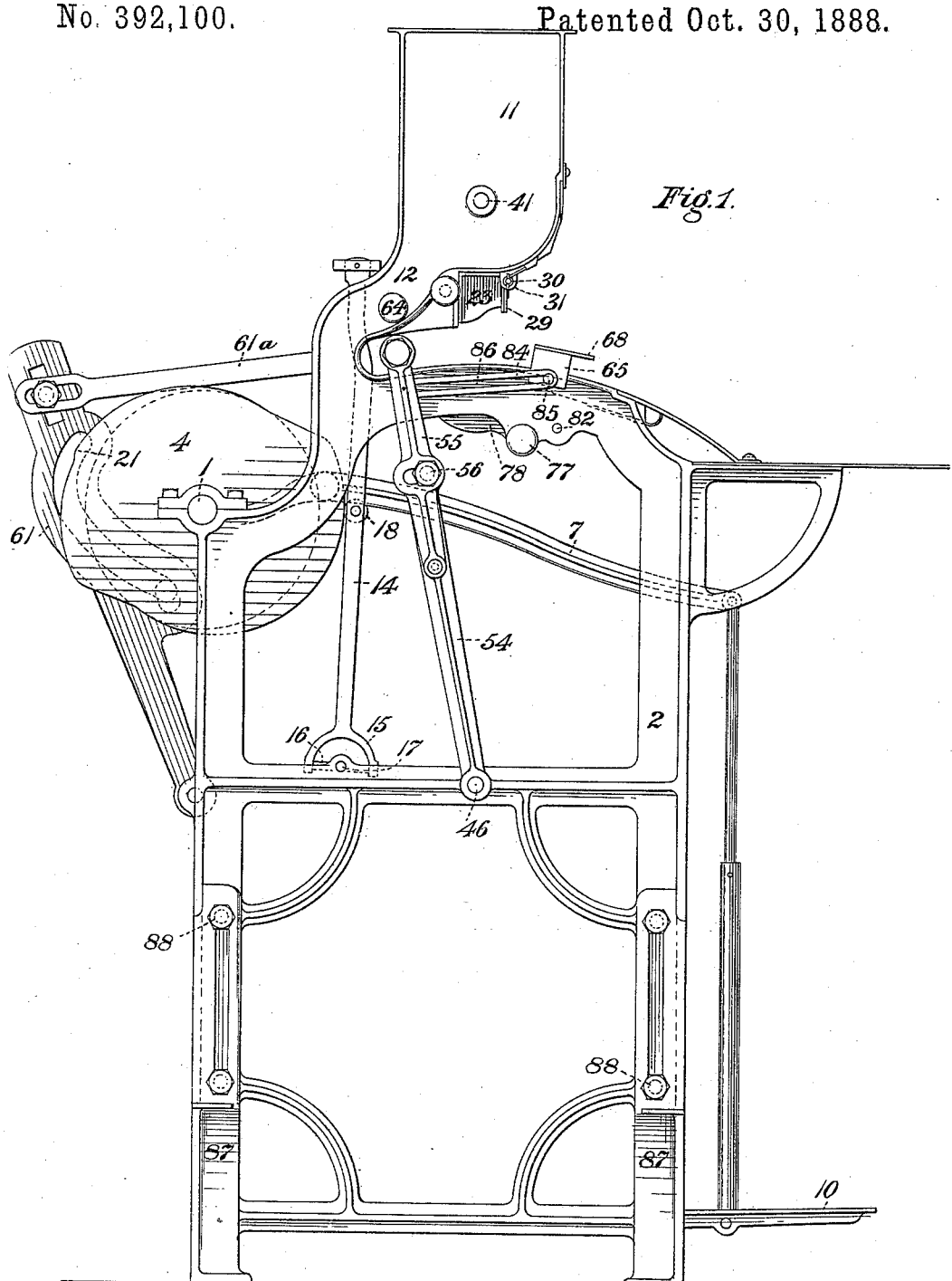

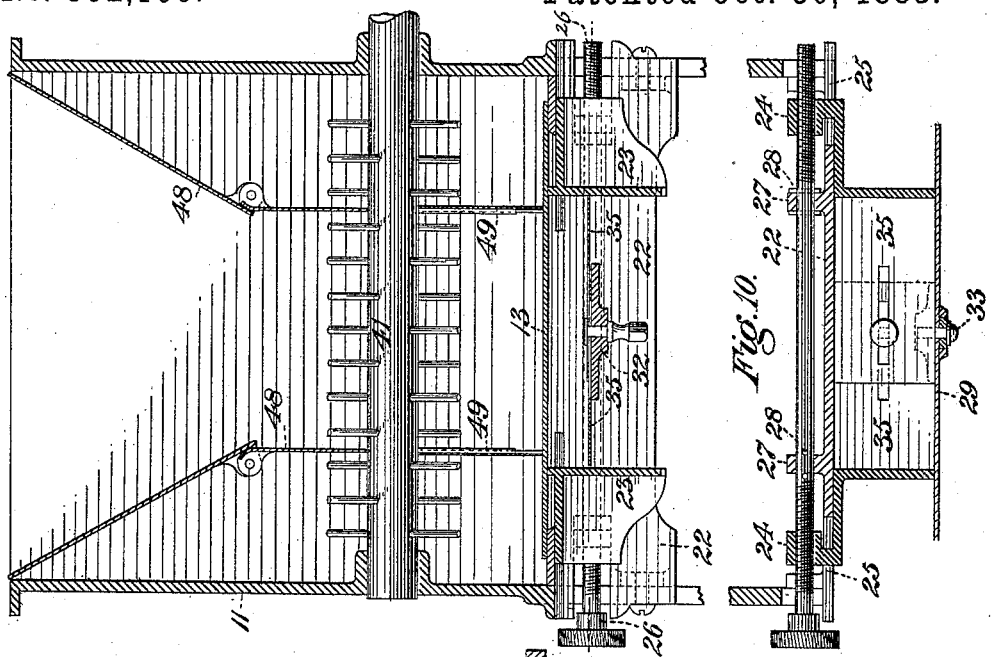

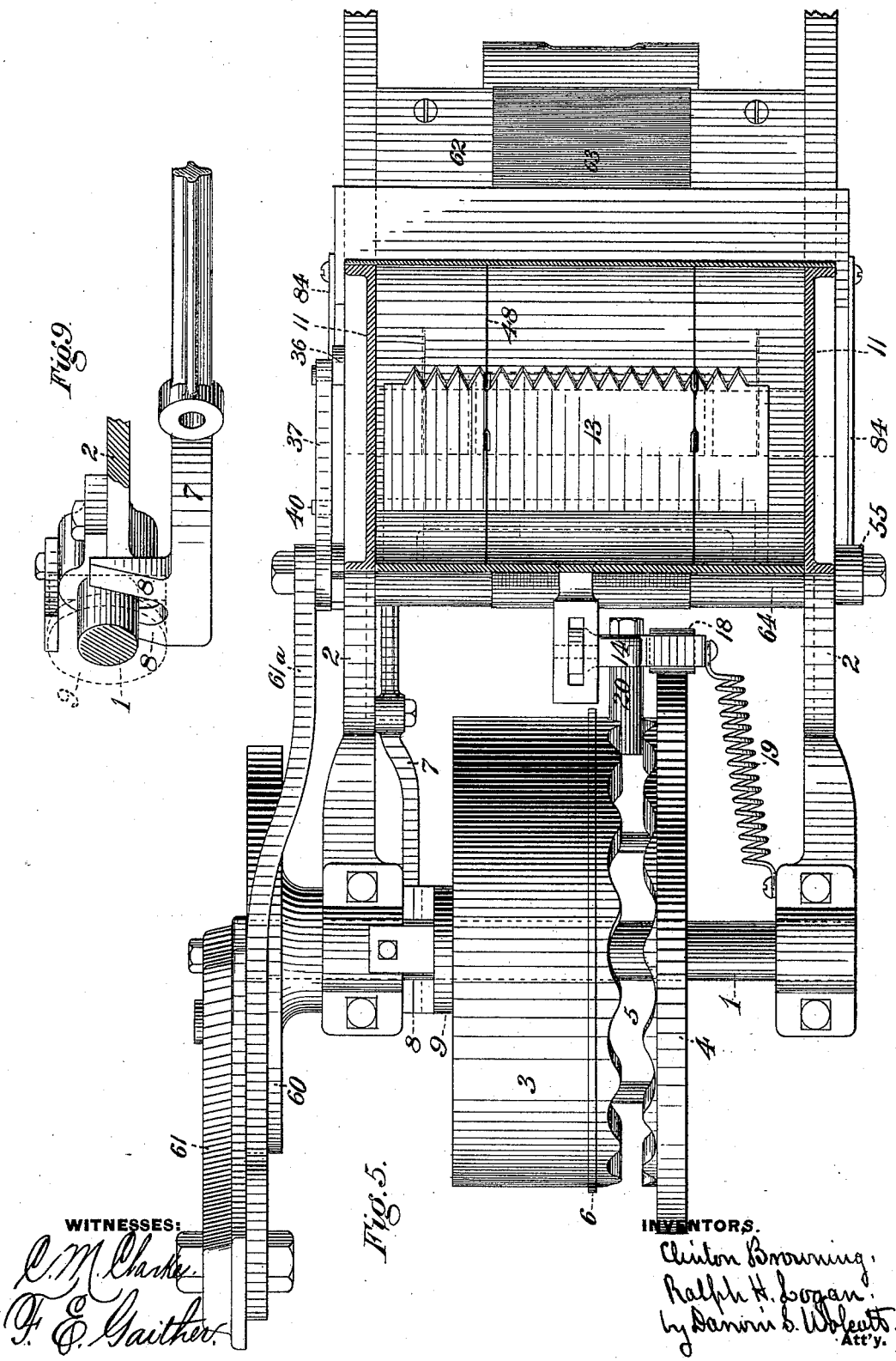

(No Model.) 7 Sheets—Sheet 5.
C. BROWNING & R. H. LOGAN.
CIGAR BUNCHING MACHINE.
No. 392,100. Patented Oct. 30, 1888.
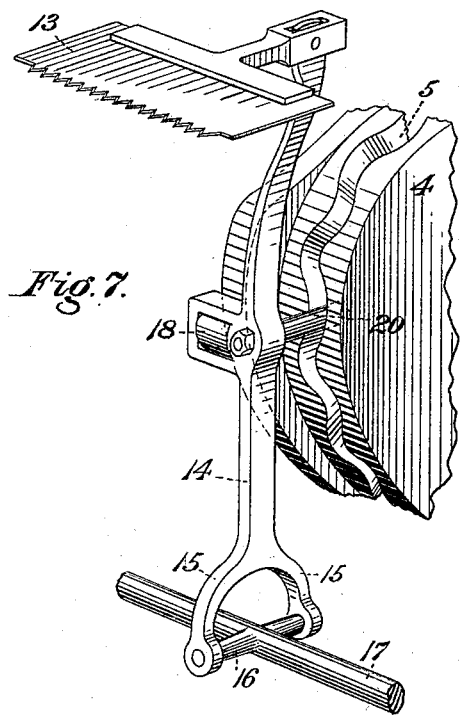
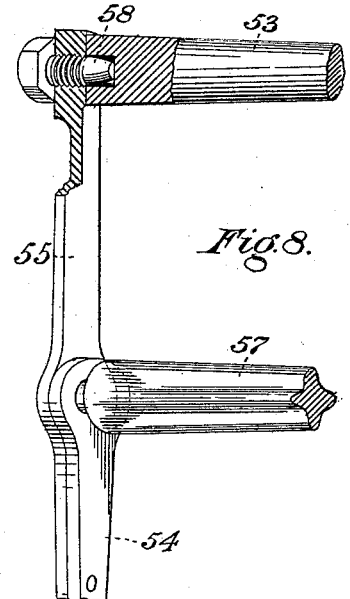
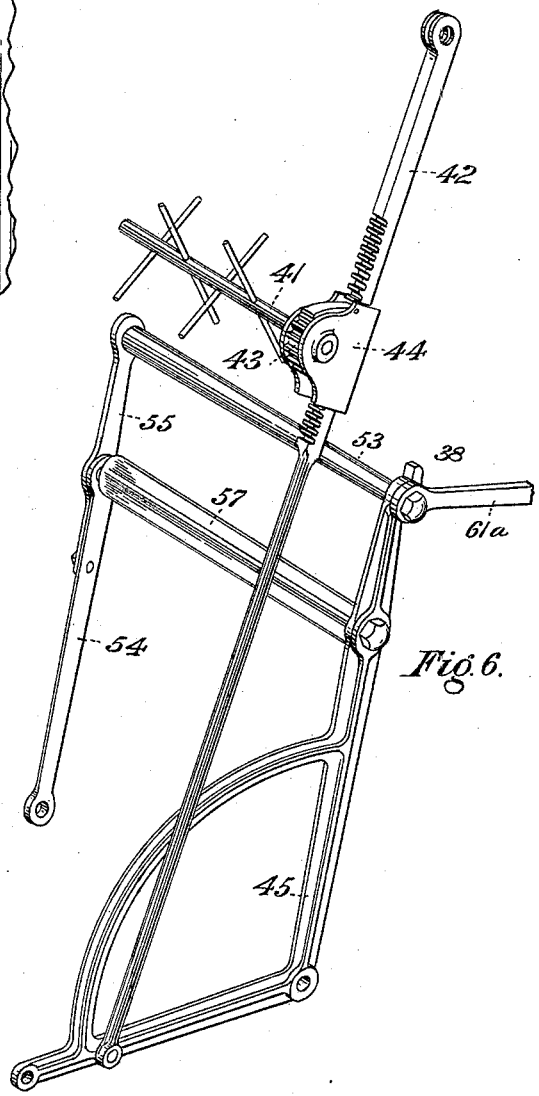

(No Model.) 7 Sheets—Sheet 6.

C. BROWNING & R. H. LOGAN.
CIGAR BUNCHING MACHINE.

No. 392,100. Patented Oct. 30, 1888.

WITNESSES:
C. M. Clarke
F. E. Gaither

INVENTOR,
Clinton Browning,
Ralph H. Logan,
by Darwin S. Wolcott
Att'y.

(No Model.) 7 Sheets—Sheet 7.

C. BROWNING & R. H. LOGAN.
CIGAR BUNCHING MACHINE.

No. 392,100. Patented Oct. 30, 1888.

UNITED STATES PATENT OFFICE.

CLINTON BROWNING, OF SHOUSTOWN, AND RALPH H. LOGAN, OF ALLEGHENY, ASSIGNORS TO THE ECLIPSE CIGAR MACHINE COMPANY, (LIMITED,) OF PITTSBURG, PENNSYLVANIA.

CIGAR-BUNCHING MACHINE.

SPECIFICATION forming part of Letters Patent No. 392,100, dated October 30, 1888.

Application filed February 18, 1888. Serial No. 264,526. (No model.)

*To all whom it may concern:*

Be it known that we, CLINTON BROWNING, residing at Shoustown, and RALPH H. LOGAN, residing at Allegheny, in the county of Allegheny and State of Pennsylvania, citizens of the United States, have invented or discovered certain new and useful Improvements in Cigar-Bunching Machines, of which improvements the following is a specification.

The invention herein relates to certain improvements in mechanism as shown and described in Letters Patent No. 383,342, granted May 22, 1888, to Clinton Browning, for forming cigar-bunches, and has for its object such a construction and arrangement of mechanical devices or elements as will prevent the filler from becoming packed in the hopper, will effect a uniform and proportional distribution of the filler to the apron-pocket, will hold the front end of the binder in proper position at beginning of the binding operation, will smooth out the binder in advance of the binding-roll, and preserve the proportional distribution of the filler during the bunching and binding operations and deliver a shaped and properly-proportioned bunch.

In general terms, the invention consists in the construction and arrangement of mechanical devices whereby the above results are attained, all as more fully hereinafter described and claimed.

Figure 12:
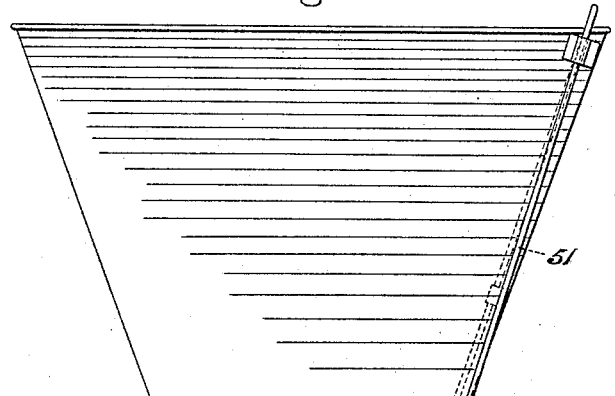
Figure 15:
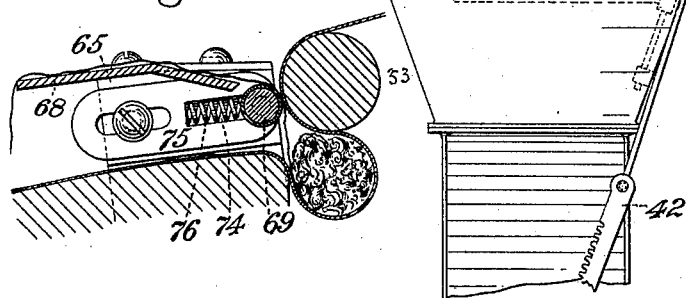
Figure 13:
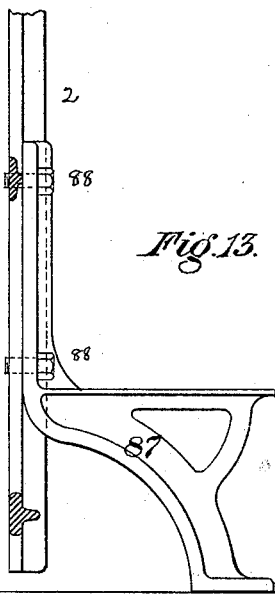
Figure 14:
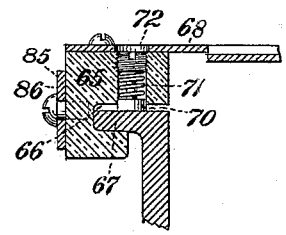
Figure 16:
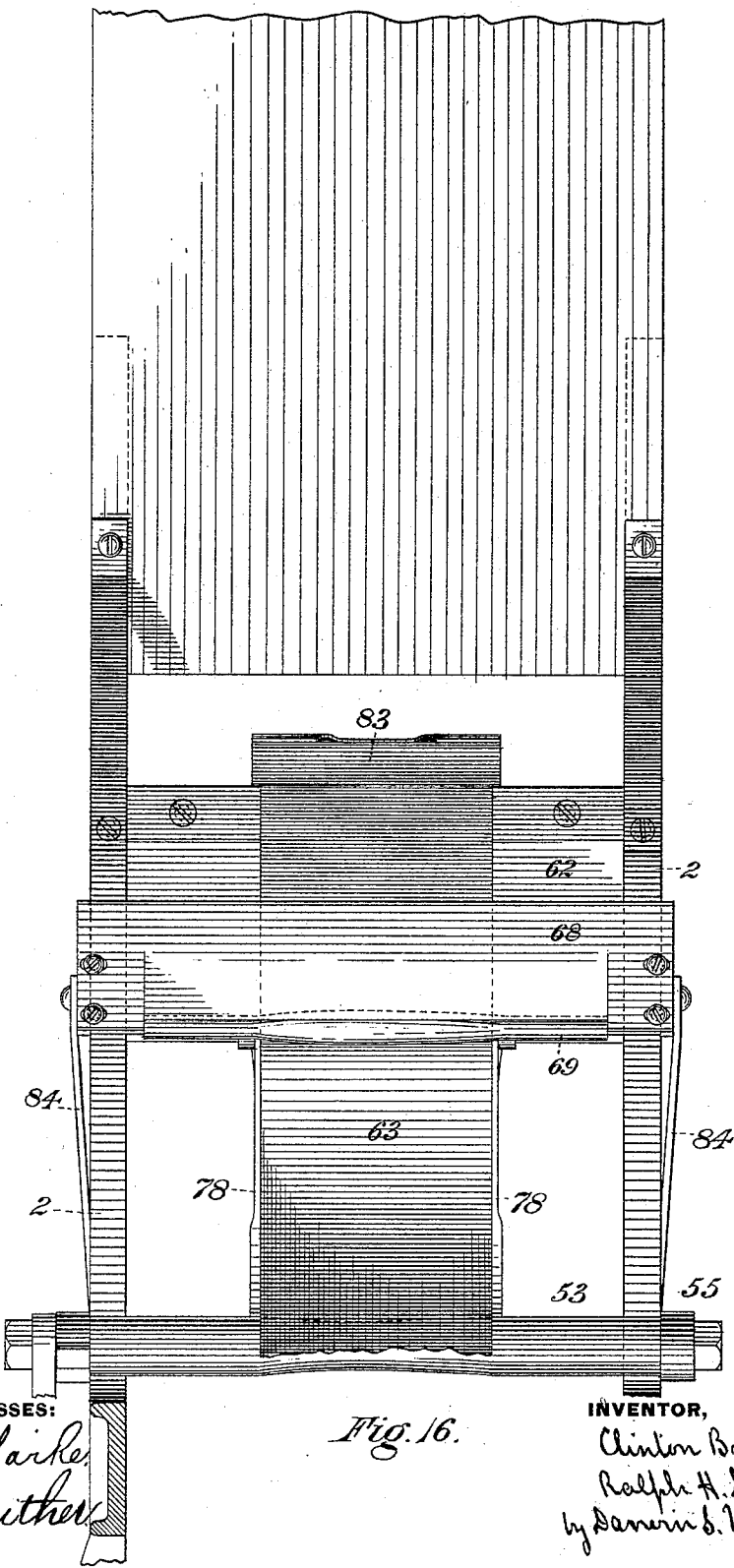

In the accompanying drawings, forming a part of this specification, Figure 1 is a view in side elevation of a machine embodying the invention herein. Fig. 2 is a similar view of the opposite side of the machine. Fig. 3 is a vertical central section through the hopper and the portions of the machine directly operative in forming the bunch. Fig. 4 is a sectional view of the hopper and filler-feeding device in the line *x x*, Fig. 3. Fig. 5 is a horizontal section on the line *y y*, Fig. 3. Figs. 6, 7, 8, and 9 are detail views, on an enlarged scale, of the operating mechanism. Figs. 10 and 11 are detail views of filler-measuring mechanism. Fig. 12 is a detail view of the hopper-extension having an agitating device applied thereto. Fig. 13 is a detail view of a portion of the frame of the machine. Figs. 14 and 15 are sectional detail views of the dam; and Fig. 16 is a plan view of the machine, the hopper being removed.

The shaft 1 is mounted in suitable bearings in the side frames, 2, of the machine, and on said shaft is loosely mounted the driving-pulley 3. A cam, 4, provided with a peripheral groove, 5, having waving or serpentine side walls, is secured on the shaft 1, alongside of the pulley 3, and to the side of said cam adjacent to the pulley is fastened a rubber or other frictional disk, 6, for the purpose of causing the cam and shaft to rotate when the pulley is forced against said disk. The longitudinal movement of the pulley along the shaft is effected by the lever 7, provided with wedge-shaped prongs 8 at its outer end, passing on opposite sides of the shaft and between one of the bearings and a collar, 9, movable along the shaft. By forcing the wedge-shaped prongs between the bearing and collar, the latter is forced along the shaft, and with it the pulley, until said pulley bears with sufficient firmness against the frictional disk to cause the cam and the shaft to rotate with the pulley. The lever 7 is operated by a treadle, 10, or other suitable lever or device arranged in convenient proximity to the operator.

The hopper 11 is supported by suitable side brackets, 12, formed on the side frames, 2, (see Figs. 1 and 2,) the front and rear sides of the hopper being inclined inwardly at their lower ends to form an opening of suitable dimensions leading into the measuring-box below the hopper. A blade, 13, is arranged above the opening into the measuring-box, adapted to close said opening at suitable intervals and to support the filler in the hopper while the contents of the measuring-box are being discharged. This blade 13, which enters the hopper through a narrow slit in its rear wall, is connected to the upper end of the lever 14, the lower end of said lever being provided with arms 15, pivotally mounted on pins 16, projecting from the rock-shaft 17, mounted in suitable bearings in the side frames, 2. This manner of mounting the lever 14 permits of its movement and that of the blade 13 back and forth and sidewise, such movements being imparted by the cam 4. The lever 14, or a friction-roller, 18, attached thereto, is held by the spring 19 against the periphery of the cam, thereby causing it to move back and forth during the rotation of the cam, and a pin, 20, attached to the lever, enters the groove 5 in the cam, the serpentine or waved walls of said groove causing the lever while the cam is in motion to vibrate rapidly sidewise. It will be noticed that the cam 4 is constructed to impart two different movements of the lever and the blade 13, and that during one of the inward movements a jar or jerk is imparted to the blade by the projection or offset 21 on the cam. The purpose of these movements of the blade is to insure a more perfect filling of the measuring-box, which is also facilitated by the continuous lateral vibrations of the blade. These lateral vibrations of the blade not only agitate the filler for the purpose above stated, but insure a freer passage of the blade through the filler and avoid any cutting or compressing of the filler, which is displaced or moved aside by the teeth or serrations on the front edge of the vibrating blade, rather than cut through or compressed against the front wall of the opening into the measuring-box, as is the case where a direct moving blade is employed.

The back wall-plate, 22, of the measuring-box is secured to the brackets 12 just below and in line with the rear side of the opening in the hopper, and the ends of the box are formed by adjustable pieces 23, provided with lugs 24, constructed to project through horizontal slots 25 in the plate 22, said lugs having threaded openings, through which passes the threaded rod 26, mounted in lugs 27 on the rear side of the plate 22, and held from longitudinal movement by pins 28, passing through the rod on opposite sides of the lugs 27. This rod 26 serves not only to hold the end pieces in place, but also to adjust them toward or away from each other, in accordance with the length of bunch to be formed. The front of the box is formed by the swinging plate 29, attached to a shaft, 30, mounted in suitable bearings formed in lugs 31, depending from the sides of the hopper. An angle-piece, 32, is attached to the inner side of the swinging plate 29 by a screw, 33, passing through a slot, 34, in the plate 29, said slot permitting of the adjustment of the angle-piece, to which are connected the plates 35, forming the bottom of the box. These plates 35 are so connected to the angle-piece as to be capable of adjustment over each other, in accordance with the adjustment of the end pieces.

It will be observed that as above constructed the ends and bottom of the box can be adjusted for the purpose of increasing or diminishing the capacity of said box in accordance with the size of the bunch to be formed.

An arm, 36, is attached to one end of the shaft 30, and to said arm is connected a push-rod, 37, having its free end arranged in line with and adapted to engage a projection, 38, on a portion of the machine carrying or moving with the bunching-roll. The push-rod 37 is provided with a curved notch, 39, adapted to engage a pin, 40, whereby the push-rod is freed from engagement with the moving projection 38. The engagement of the push-rod with the moving projection 38 swings the plate 29 and bottom plate, 35, into such position as to allow of the free discharge of the filler from the measuring-box, said plates being returned to normal position by the spring as soon as the push-rod is freed from the projection 38, as above described.

In order to keep the filler loose, so that it will readily feed into the measuring-box, a shaft, 41, provided with a series of radial pins, is mounted in suitable bearings in the sides of the hopper a short distance above the opening into the measuring-box. This shaft 41 is rotated first in one direction and then in the other by a rack, 42, held in engagement with a pinion, 43, on the shaft by a bridle, 44, supported by the shaft and serving as a guide for the rack, which is connected at its lower end to one arm of the bell-crank lever 45, secured to one end of a shaft, 46, mounted in suitable bearings in the side frames, 2, of the machine. As above described, provision is made by the movable end pieces for shortening the measuring-box in accordance with the length of cigar to be formed, and hence when manufacturing cigars of a length less than the maximum for which the machine is designed there will be a dead-space at the lower end of the hopper on each side of the feed-opening, as shown in Fig. 4, where a considerable quantity of the filler will lodge and will interfere with a free feed of the filler to the measuring-box. In order to overcome this objection, removable plates 48 are arranged at the ends of the hopper, as shown in Fig. 4. Each of the plates 48 consists of two sections hinged together, in order that one section may be arranged vertically and the other inclined, and also in order to allow of the adjustment of the plates in accordance with the positions of the end pieces, 23, the vertical sections of the plates 48 being preferably arranged in approximately the same vertical planes with the inner faces of the end pieces, 23. The lower sections of the plates 48 are slotted to permit of their being slipped over the shaft 41, and the metal at the edges of the slots is turned back, forming hooks with which the correspondingly-bent edges of the slides 49 engage, said slides being arranged to cover the slots and prevent ingress of the filler into the space behind the plates 48.

The capacity of the hopper 11 may be increased by a supplemental hopper (see Fig. 12) having inclined sides and constructed to be attached to the top of the main hopper. In order to insure a continuous and free downward movement of the filler through the hopper, a U-shaped rod, 51, provided as to one of its arms with one or more fingers, 52, is slipped over one of the sides of the supplemental hopper, the arm carrying the fingers being mounted in suitable guides or bearings within the hopper, the opposite arm being connected to the reciprocating rack-bar 42. The agitation produced by the movement of the fingers 52 will prevent any clogging of the filler within the hopper.

Turning now to the mechanism directly operative in forming and binding the bunch, the roller 53 is loosely mounted in the ends of one arm of the bell-crank 45 and of the arm 54, which is secured at its opposite end to the shaft 46, serving as a pivot for the bell-crank. The arm 54 is formed in two parts, the upper part or extension, 55, being pivoted to the lower part, 54, and is held in proper relation thereto by a bolt, 56, employed for connecting the arm 54 to the brace-rod 57, said bolt passing through a slot in the extension 55, whereby an angular adjustment of the roller 53 may be effected, as hereinafter described. The roller 53 is mounted on conical pins 58, the holes in the ends of the roller being so shaped as to permit of its angular adjustment, above referred to, without binding upon the pins 58, as shown in Fig. 8. The bell-crank 45, and with it the roller 53, is reciprocated by the main driving-shaft 1 through the medium of a crank-pin, 59, on the disk 60, secured to the driving-shaft, said pin operating in a curved slot in the lever 61, to the upper end of which the rod 61ª, leading to the bell-crank, is adjustably attached.

A rolling-table, 62, having a curved upper surface corresponding to the arc of the circle described by the roller 53 in its movements, is secured between the side frames, with its rear end a little forward of the line of feed of the filler from the measuring box. An apron, 63, having one end attached to the front end of the table, passes back over the table and the bunching-roller 53, and is attached to a tension-roll, 64, whereby the necessary amount of slack is regulated. As is customary in cigar-bunching machines, the apron is left sufficiently loose to form a pocket for the reception of the filler, which is deposited therein at the beginning of the forward movement of the roller, in the manner hereinbefore stated.

In order to smooth out the binder and apply a slight degree of tension thereto during the binding operation, and also to prevent any spreading out of the filler onto the portion of the binder on the table as the roller approaches and moves onto the table, a movable dam constructed to operate in effecting its several functions in conjunction with the roller 53 is arranged in front of the bunching-roller. This dam consists of the blocks 65, provided with grooves 66, fitting over the ledges 67, projecting outwardly from the frames 2, a plate, 68, connecting said blocks and a smoothing-roll, 69. The grooves 66 in the blocks 65 are made of such a width as to permit of perfect freedom of movement to the blocks; but in order to prevent the dam from moving forward, except as impelled by contact with the roller 53, each block is provided with a tension device consisting of the pin 70, arranged in an opening in the blocks, so that its head bears upon the ledge or flange 67, the degree of pressure being regulated by the spring 71 and the adjusting-screw 72. (See Fig. 14.) The pressure of the pin 70 on the ledge should be so adjusted that the dam will not be knocked forward on the first impact of the roller 53 with the roll 69, but will move freely with said roller. The plate 68 is cut near the blocks 65, so that a portion of the plate may be bent down tangential, or approximately so, with the roll 69. This roll 69 is provided at its ends with trunnions, which are mounted in boxes, said boxes being arranged in slots 74, formed in plates 75, adjustably secured on the inner faces of the blocks 65. (See Figs. 3 and 15.) The roll 69 is held forward, so as to bear yieldingly upon the roller 53, by springs 76, arranged in the slots 74 between the boxes and the ends of the slots. While the roller 53 and the dam are in the position shown in Fig. 3 a binder is placed over the plate 68 and roll 69, one end of the binder being pushed down into the pocket in the apron and between the rear end of the table and the clamping-plates 78, said plates being attached to the rod 77, mounted in suitable bearings in the frames 2. These clamping-plates are provided with tails 79, extending upwardly into the path of the roller 53, which in its rearward movement strikes against said tails, thereby turning the front edges of the plates back and away from the end of the table, so as to permit of the insertion of one end of the binder, as above stated. As the roller 53 moves forward, the tails 79 are released, thereby permitting of the plates being moved forward under the action of the spring 80, surrounding the rod 77, and lightly bear upon the end of the binder. In order to prevent the plates from bearing too hard against the binder, fingers 81, formed on said plates, come into contact with a bar, 82, extending between the frames 2, in the path of the fingers 81. As the roller 53 moves forward, the projection 38, formed in this instance upon the bell-crank carrying the roller 53, strikes the push-rod 37, thereby opening the measuring-box and permitting the filler therein to drop into the loop or pocket in the apron. After the deposition of the filler, as above stated, the roller in its forward movement closes the loop or pocket in the apron and strikes against the roll 69, or, rather, against the binder, which has been arranged over the roll 69, as previously stated. It will be observed that as the binder extends from a point within the pocket to and over the roll 69 there is formed a wall approximately vertical and of sufficient height to prevent the filler from being spread forward along the apron. As the roller 53 moves forward along the table, the filler is compressed and the binder wrapped around it by the action of the apron, the pressure to which the binder is subjected by the roller 53 and roll 69, due to the action of the tension devices in the blocks 65, being sufficient to smooth out the binder and hold it sufficiently tight to cause it to wrap closely around the filler. As the roller 53 moves forward beyond the table, the bunch thus formed is deposited by the apron into the curved plate 83, or other suitable receptacle adjustably attached to the under side of the table. The forward movement of the dam is effected by contact of the roll 69 with the roller 53, as hereinbefore described, and its return movement to normal position at the rear end of the table, as shown in Figs. 1 and 3, is effected by the rods 84, which are connected at their rear ends to the devices carrying the bunching-roller 53, and at their front ends to the blocks 65 of the dam, such connection being formed by pins 85 on the blocks engaging slots 86 in the rods 84, said slots being made of such a length that when the roller 53 has reached the rear limit of its movement the dam will have been drawn to its normal position, and when the roller 53 moves forward the rods 84 will slip along the pins 85, the dam remaining stationary until the roller 53 strikes against the roll 69.

In manufacturing bunches for irregularly-shaped cigars—i. e., cigars tapering toward one or both ends—the bunching-roller 53 is constructed as regards that portion operative on the bunch so as to impart the desired shape or form to the bunch—that is to say, in forming bunches which taper with a greater or less degree of uniformity from one end to the other, the working portion of the roller is made conical, or approximately so, and in making bunches which taper from or near the middle to each end the operative portion of the roller is made concave. The smoothing-roll 69 is made of a shape complementary to that of the roller 53, and is preferably covered with some soft yielding material, as rubber, felt, &c. The ends of the roller 53 and roll 69 outside of the portions operative in forming the bunches are made cylindrical and of such diameters relative to their operative portions that the edges of the apron will be held by the cylindrical portions while the middle portion of the apron and the binder are lightly clamped between the operative portions of the roller and roll. This relative construction of the roller and roll, which is clearly shown in Fig. 16, prevents any twisting of the apron and insures an equal and true feed thereof between them.

In forming bunches tapering from a point at or near one end to the other, for which purpose a roller, 53, having a conical operative portion is used, the roller is mounted with its larger end toward the adjustable extension 55 of the arm 54, and said extension is so adjusted that the larger end of the roller, which is operative in forming the smaller end of the bunch, will catch one corner of the binder and wrap the same entirely or partially around the bunch before the small end of the roller shall have acted on the binder. In other words, the binding operation begins at the small end of the bunch and is effected progressively toward the larger end. This spiral wrapping of the binder, as it might be termed, is practically similar to the method employed in wrapping cigar-bunches, and, as is the case in wrapping cigars, each successive wrap or turn of the binder overlapping, as it does, the preceding one, thereby binding such preceding turn in place, the operator need only catch the larger end of the bunch in handling the same. The above-described method of wrapping the binder—i. e., beginning the operation at one end of the bunch and continuing the same progressively to the opposite end—is equally applicable in the manufacture of bunches of any contour or shape, and with a roller having either a tapering or cylindrical operating body portion and adjusted angularly to its line of movement in forming a bunch.

The table is held in position by the side frames, 2, which are drawn toward each other, so as to firmly grasp the table, by nuts on the outer ends of the rod or bar 82. This manner of holding the table permits of its adjustment for the purpose of forming taper bunches. The nuts being slacked off, the table can be tipped at either side and again secured in position by tightening up the nuts.

The plates 78 serve not only to catch the end of the binder, as hereinbefore described, but also prevent any lateral escape of the filler from the pocket in the apron, said plates being arranged at the ends of the pocket.

The feet or pedestals 87 are formed independent of the side frames, (see Fig. 13,) and are adjustably secured to said frames by bolts 88, passing through slots in the feet or pedestals and screwing into the frames. This construction permits of the adjustment of the machine in height to suit the preferences of different operators.

We claim herein as our invention—

1. In a cigar-bunching machine, the combination of a hopper, a measuring receptacle or box connected thereto, and a reciprocating and laterally-vibrating blade for controlling the feed from the hopper to the measuring-receptacle, substantially as set forth.

2. In a cigar-bunching machine, the combination of a hopper, a measuring receptacle or box connected thereto and provided with a swinging door, and a reciprocating and laterally-vibrating blade for controlling the feed from the hopper to the measuring box or receptacle, substantially as set forth.

3. In a cigar-bunching machine, the combination of a hopper, a measuring-box having adjustable sides and a swinging plate carrying bottom plates, and removable plates arranged within said hopper, each of said plates being formed of two sections hinged together, whereby inclined and vertical guide-walls may be formed, substantially as set forth.

4. In a cigar-bunching machine, the combination of a hopper, a measuring-box connected thereto, a blade for controlling the feed to the measuring-box, and a cam provided with a groove having waved or serpentine walls for reciprocating and laterally vibrating the blade, substantially as set forth.

5. In a cigar-bunching machine, the combination of a hopper, a measuring-box connected thereto, and a reciprocating and laterally-vibrating blade provided with teeth or serrations for controlling the feed to the measuring-box, substantially as set forth.

6. In a cigar-bunching machine, the combination of a table, a bunching-roller, a roll for smoothing and lightly holding the binder, having a shape corresponding to the shape of the bunching-roller, and so mounted as to be movable forward and rotated by contact with the bunching-roller, and an apron passing over the table and bunching-roller, substantially as set forth.

7. In a cigar-bunching machine, the combination of a table, a bunching-roller, a roll for smoothing and lightly holding the binder, having a shape corresponding to the shape of the bunching-roller, said roll being journaled in yielding bearings, and so mounted as to be moved forward and rotated by contact with the bunching-roller, and an apron passing over the table and bunching-roller, substantially as set forth.

8. In a cigar-bunching machine, the combination of a table, a movable bunching-roller, a dam having a yielding bearing on guides at the sides of the table and movable with the bunching-roller, and an apron passing over the table and bunching-roller, substantially as set forth.

9. In a cigar-bunching machine, and as an improvement upon the combination consisting of a table, a bunching-roller, a roll for smoothing and lightly holding the binder, and an apron, said roller and roll formed with such portions thereof as are in contact with the apron near its edges cylindrical in cross-section, and the portion between such cylindrical ends corresponding in shape to the bunch to be made, substantially as set forth.

In testimony whereof we have hereunto set our hands.

CLINTON BROWNING.
RALPH H. LOGAN.

Witnesses:
DARWIN S. WOLCOTT,
R. H. WHITTLESEY.